(No Model.)
S. DUFFIELD.
MANUFACTURE OF GAS AND WATER FITTINGS.
No. 261,320. Patented July 18, 1882.
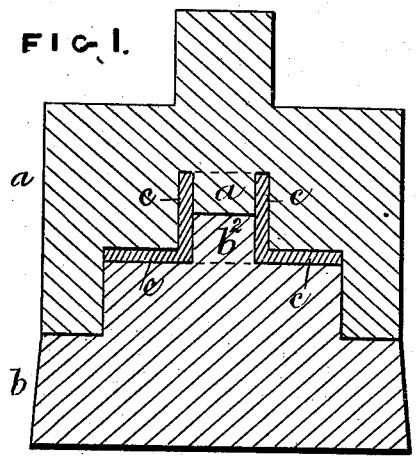
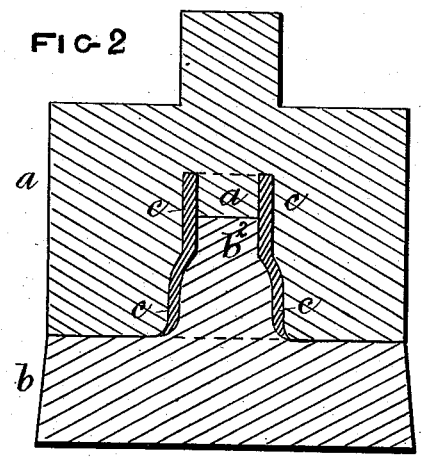
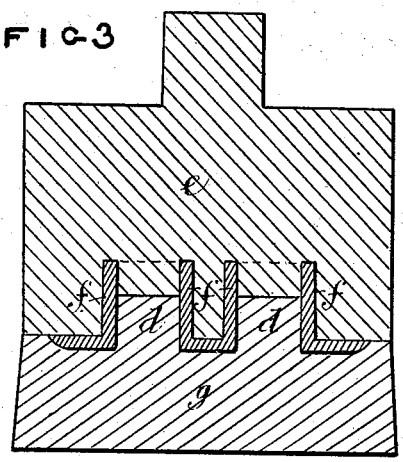
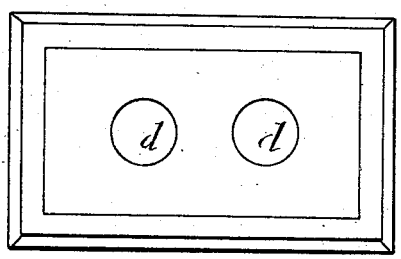
Witnesses
Enos James
Richard Skerrett
Inventor
Silas Duffield

UNITED STATES PATENT OFFICE.

SILAS DUFFIELD, OF WILLENHALL, COUNTY OF STAFFORD, ENGLAND.

MANUFACTURE OF GAS AND WATER FITTINGS.

SPECIFICATION forming part of Letters Patent No. 261,320, dated July 18, 1882.

Application filed May 22, 1882. (No model.) Patented in England May 16, 1879, No. 1,958; in France June 3, 1879, No. 131,016, and in Belgium June 4, 1879, No. 48,392.

*To all whom it may concern:*

Be it known that I, SILAS DUFFIELD, a subject of the Queen of Great Britain, residing at Willenhall, in the county of Stafford, England, have invented certain new and useful Improvements in the Manufacture of Gas, Steam, and Water Fittings, such as T's, elbows, and crosses, (for which I have received Letters Patent in Great Britain, No. 1,958, dated 16th May, 1879; in France, dated 3d June, 1879, No. 131,016, and in Belgium, dated 4th June, 1879, No. 48,392,) of which the following is a specification.

This invention has for its object the manufacture of iron elbows, T's, and crosses, and is accomplished by the pressure of a stamp (by preference) while hot, whereby one portion is by the first process formed complete or cylindrical, and the other part or parts have a deep gutter—say, for instance, in making a T, the top part, being left as a gutter from the stamp, is, while hot, placed in a press or stamp, and the concave or gutter part is pressed to the form of a cylinder, and before cooling it is heated to a welding state, and being placed under a stamp, hammer, or oliver is welded and shaped at the same time. The elbow or cross is made in the same manner, the shape of the top and bottom dies being suitable. The tapping or screwing is done by the usual process. The section of the iron and the heat required are soon ascertained.

Having thus set forth the nature of my invention, I next proceed to describe it with reference to the drawings, and to the letters and figures marked thereon.

Figure 1 is a longitudinal section of a top and bottom die for forming a T-fitting, and Fig. 2 is a cross-section of the same. Fig. 5 is a cross-section of a T partly formed, showing the branch or outlet made by my first process, and the ears or flanges, which may be either curved, as shown in this figure, or flat, as shown in Fig. 3, which relates to the manufacture of a cross. Fig. 6 is also a cross-section of a T, but with the flanges or ears rounded to form the top part of the T. Fig. 3 is a longitudinal section of top and bottom dies—e. g., for forming a cross-fitting. Fig. 4 is a plan view, showing the studs or cores marked $d$. Fig. 6 is a cross-section of a T with the ears or flanges turned over ready for welding.

I will now describe my process for making a T. The top die, $a$, of Fig. 1 is raised from the bottom die, $b$, and the end of a heated bar of iron is laid upon the stud $b^2$ by means of quick and heavy blows from a screw or steam hammer, or of pressure from a stamp or steam press or other suitable appliance. The heated end of the iron bar is made to fill up the spaces or apertures $c\ c\ c\ c$, thus forming a socket or cylinder projecting from a flat or curved base, which I have called, so that I may the more easily be understood, "ears or flanges," $h$. The T, which is now represented by Fig. 5, is at once detached from the end of the bar of iron, and the waste iron between $a$ and $b$ and on the ends of $h\ h$ is now removed by properly-constructed tools. The ears or flanges are now, while still hot, bent round, so as to form a cylinder, at right angles to the branch or outlet by means of another stamp or press upon a mandrel, thus forming the partly-finished T, as shown in Fig. 6. The T is now heated to a suitable degree of heat, and, being placed under a stamp, steam-hammer, or oliver, the two ends which have been brought together are welded, and the T is so far finished that it is ready for screwing. The elbow is formed similarly to the T, excepting that the dies are so adapted as to leave sufficient iron on one side of the branch as will allow of the same being soundly welded to form the outer angle of the elbow. The welding, dressing, and screwing are performed similar to the manner already described in making the fitting usually termed a "cross," to which any number of outlets or branches may be made at one process by means of dies suitably constructed on the plan of the one shown in Fig. 3. The iron is compressed into the spaces $f f f f$, or as many other spaces as will form the required number of branches or cylinders upon the flat base. The ends or ears of the base are then treated in the same manner as previously described, and the cross-fitting is then ready for screwing.

Having now fully described my said invention and the manner of carrying the same into effect, what I claim is—

1. The herein-described dies for forming elbows, T's, and crosses for gas and other fittings, having the form shown and specified—that is to say, having one or more cores surrounded by annular spaces to form the upright cylindrical branch or branches, and continuous side spaces to form the ears or flanges depending from said upright branch or branches, substantially as described.

2. The method of forming elbows, T's, and similar joints for gas and steam fittings, consisting in pressing out from a bar of metal by means of suitable dies the unfinished joint having one or more upright branches with depending ears or flanges, and then completing the joint by bringing together the edges of said ears or flanges over a core or mandrel and uniting them, substantially as described.

SILAS DUFFIELD. [L. S.]

Witnesses:
ENOS JAMES,
RICHARD SKERRETT.